United States Patent

[11] 3,596,483

| [72] | Inventor | Harold V. Elliott<br>Saginaw, Mich. |
|---|---|---|
| [21] | Appl. No. | 840,282 |
| [22] | Filed | July 9, 1969 |
| [45] | Patented | Aug. 3, 1971 |
| [73] | Assignee | General Motors Corporation<br>Detroit, Mich. |

[54] STEERING COLUMN LOCK
3 Claims, 5 Drawing Figs.

[52] U.S. Cl. ................................................. 70/186,
70/252, 64/29
[51] Int. Cl. ....................................................... B60r 25/02
[50] Field of Search........................................... 70/186,
422, 182, 183, 184, 185, 252; 292/74; 64/29

[56] References Cited
UNITED STATES PATENTS

| 1,249,755 | 12/1917 | Holmgren.................. | 70/186 UX |
| 3,379,034 | 4/1968 | Gustafson.................. | 64/29 |
| 3,490,255 | 1/1970 | Wight et al. ................ | 70/252 |

*Primary Examiner*—Albert G. Craig, Jr.
*Attorneys*—W. E. Finken and D. L. Ellis ABSTRACT: A steering column lock is provided with a lock bolt selectively engageable with a keeper on the steering shaft component of the steering column to hold the latter against rotation, the lock bolt being provided with a tapered head engaging the keeper and operative in the presence of predetermined large amounts of torque on the steering shaft component to provide a force component tending the bolt to move out of its locked position.

INVENTOR.
Harold V. Elliott
BY
D. L. Ellis
ATTORNEY

PATENTED AUG 3 1971

INVENTOR.
Harold V. Elliott
BY
D. L. Ellis
ATTORNEY

STEERING COLUMN LOCK

This invention relates to coincidental locks for simultaneously rendering inoperable various agencies of automotive vehicle control and more particularly to an improved steering column lock for automotive vehicles.

In Ser. No. 691,817 filed Dec. 19, 1967, now U.S. Pat. No. 3,490,255 dated Jan. 20, 1970, in the name of Wight et al. disclosure is made of a steering column lock incorporating the features of coincidental locking of the vehicle steering shaft, the transmission selector, and the ignition circuit control switches through manipulation of a column mounted cylinder lock actuator. The steering shaft component is locked by a steering shaft bolt mounted for slidable movement in a stationary housing portion of the steering column between an unlocked position withdrawn from a series of keeper notches in a keeper plate on the steering shaft, and a locking position engageable with any registered one of the keeper notches.

The present invention provides improvement in such coincidental steering column locks through provision of a steering shaft lock bolt having a locking head formed with a suitable taper in its portions engageable with the keeper plate so that at a predetermined large amount of torque on the steering shaft causing forcible engagement between the keeper plate and the head of the lock bolt, a cam out tendency is provided on the lock bolt for moving it from locked to unlocked positions. This improvement meets two problems found in prior art steering column locks of this nature, the first being that it has been found that in some cases where the vehicle had been parked with the steered wheels thereof turned tightly into a curb or like abutment and subsequently the steering column lock actuated into locking condition placing the steering shaft lock bolt within the keeper plate, the release of manual or power steering torque on the steering shaft component following the locking allows the curb deflection of the dirigible road wheels to exert reaction force through the steering shaft train to the keeper plate binding the latter and the lock bolt head together. In such circumstances it can be quite difficult to remove the steering shaft lock bolt from its locking position by the use of normal effort on the cylinder lock actuator of the lock assembly. Secondly, while prior art steering column locks have been designed to require nearly complete destruction of the steering column, as under a forced turning of the steering wheel or otherwise, to defeat the steering shaft lock bolt, the present invention provides a secure locking system but reduces significantly the likelihood of severe damage to the steering column in attempts to defeat the lock.

Thus, in the case of a predetermined maximum forcible torquing of the steering shaft component by the steered wheels in the locked condition of the parts, the frictional binding on the steering shaft lock bolt of the present invention is accompanied by a cam out component thereon of a predetermined amount to which need only be added a nominal acceptable amount of force on the cylinder lock actuator to selectively remove the locking bolt from locked condition. In the case of a larger amount of forcible torquing of the steering wheel and steering shaft component as by a thief during attempts on the lock, the steering shaft bolt is actually cammed out of locking position, but, especially in the case where a large number of keeper notches are provided in the keeper plate, the thief is foiled by a successive rachetlike projection of the steering shaft bolt by a spring or the like back into the succeeding keeper notches presented to the bolt during small increments of the forcible rotation of the steering wheel.

Accordingly, the primary object of this invention is to provide an improved steering column lock addressed to the described problems and including a steering shaft bolt and a steering shaft keeper wherein substantial predetermined forcible torquing on the steering shaft component causes a camming of the lock bolt from locked to unlocked position.

A more specific object of this invention is to accomplish the camming out tendency on the lock bolt by a suitably selected taper on the locking head of the steering shaft lock bolt engageable by the keeper member.

These and other objects and features of the invention will be readily apparent from the following specification and from the drawings wherein.

Figure 1:
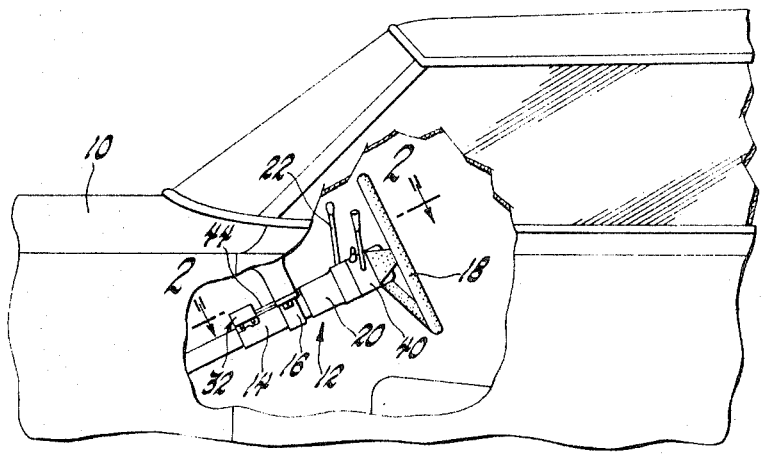
FIG. 1 is a partially broken away fragmentary elevational view of an automotive vehicle including a steering column and a steering column lock according to this invention.

Referring now particularly to FIG. 1 of the drawings, a vehicle body 10 includes a steering column assembly 12 mounted in the forward passenger compartment and extending through the body firewall of the vehicle engine compartment, not shown. The steering column structure as is conventional includes a supporting outer column or tube 14 mounted on the body 10 by means of a bracket 16 on the instrument panel structure of the body and additionally by a similar bracket on the firewall structure. The support column 14 conventionally rotatably mounts therewithin the vehicle steering shaft which carries at its upper end the steering wheel 18, and the rotatable power transmission range selector tube which carries at its upper end a shift bowl 20 having a selector lever 22.

Figure 2:
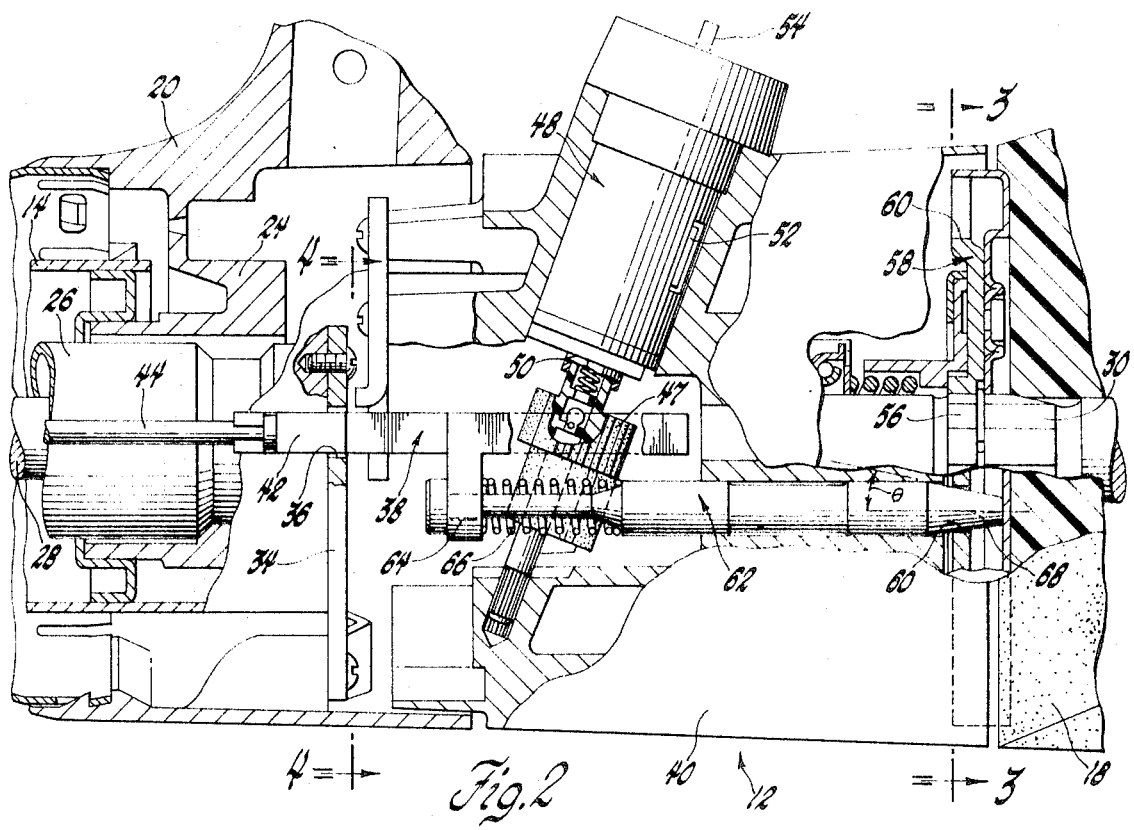
FIG. 2 is an enlarged partially broken away view taken generally along the plane indicated by lines 2-2 of FIG. 1.

As seen more clearly in FIG. 2, the shift bowl 20 includes a hub portion 24 suitably rotatably mounted on the support column 14 and fixed to the selector shift tube, designated 26. The steering shaft, designated 28, extends within the shift tube 26 from lower connection to the vehicle steering gear within vehicle engine compartment upwardly to have splined connection at 30 with the hub portion of the steering wheel 18.

Reference may be had to the above-identified application Ser. No. 691,817 for a more complete understanding of the general type of steering column lock structure disclosed herein, but generally the lock includes provisions for selective prevention of rotation of the shift bowl 20 and shift tube 26 out of some predetermined selected range of the vehicle transmission, such as "park" or "reverse" while simultaneously preventing rotation of the steering shaft 28. Coincidentally therewith, an ignition switch 32 mounted on the support column 14 is placed in an inoperative condition during the locked conditions of the shift tube and the steering shaft, Specifically, the shift bowl 20 carries thereon a keeper plate 34 notched at 36 for reception of a longitudinally slidable shift tube bolt 38 which is suitably mounted for such slidable movement in a channel within the die-cast or similarly constructed stationary housing portion 40 of the steering column, the latter being fixed to the support column 14. Upon selected rotation of the shift bowl 20 and shift tube 26 to the selected or predetermined transmission condition, such as "park," the notch 36 on the keeper plate 34 is accordingly aligned with the path of movement of the bolt 38 so that the bolt may be reciprocated to locked position, shown in FIG. 2, placing a locking projection or lug 42 of the bolt in the notch and preventing rotation of the shift bowl from such position. A switch actuating rod 44 is attached to the end bolt 38 and extends to the ignition switch 32, such as shown in FIG. 1, for operating of the ignition switch between "off" and "on" conditions simultaneously with reciprocation of the bolt 38 between locked and unlocked positions. Further, in the case of additional circuitry in ignition switch 32 such as for a starter motor for the vehicle engine, or an accessory switch position, added travel in the reciprocating path is provided in bolt 38 to accomplish these switch functions. The bolt 38 is selectively moved in its path between the various above-noted positions by a rack and sector connection including a rack 46 integral with the bolt and a toothed sector 47 rotatable as a unit with the core 50 of a cylinder lock actuator, designated generally 48, mounted in housing 40. The core is of generally conventional structure with a series of key-operable tumblers and, a side locking bar 52 extensible by key withdrawal to selectively lock the core in a fixed rotary position within housing 40.

Upon insertion of a suitable coded key, indicated 54, into the actuator 48 the side bar is withdrawn to allow rotation of the core 50 from the locked position, shown, to a position rotating the sector 47 to cause translation of the bolt 38 leftwardly as seen in FIG. 2, removing the hub 42 from notch 36, and simultaneously moving the ignition switch 32 to "on" or "start" conditions. Rotation of the actuator 48 by the key in the opposite direction returns the bolt 38 rightwardly and, assuming the shift bowl 20 located in the predetermined "part," or like condition, lug 42 enters the notch 36 and the ignition switch 32 if placed in "off."

Figure 3:
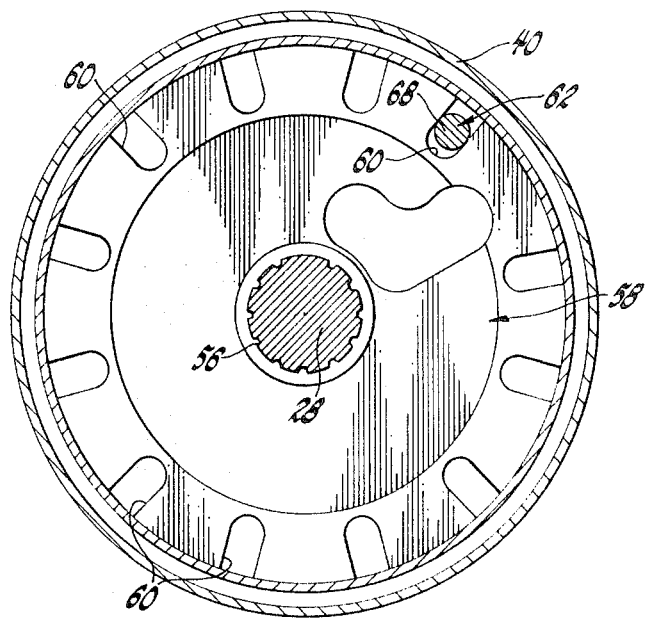
FIG. 3 is a sectional view taken generally along the plane indicated by lines 3-3 of FIG. 2.
Figure 4:
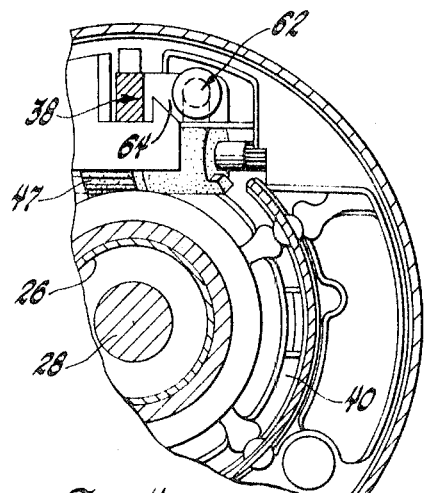
FIG. 4 is a sectional view taken generally along the plane indicated by lines 4-4 of FIG. 2.
Figure 5:
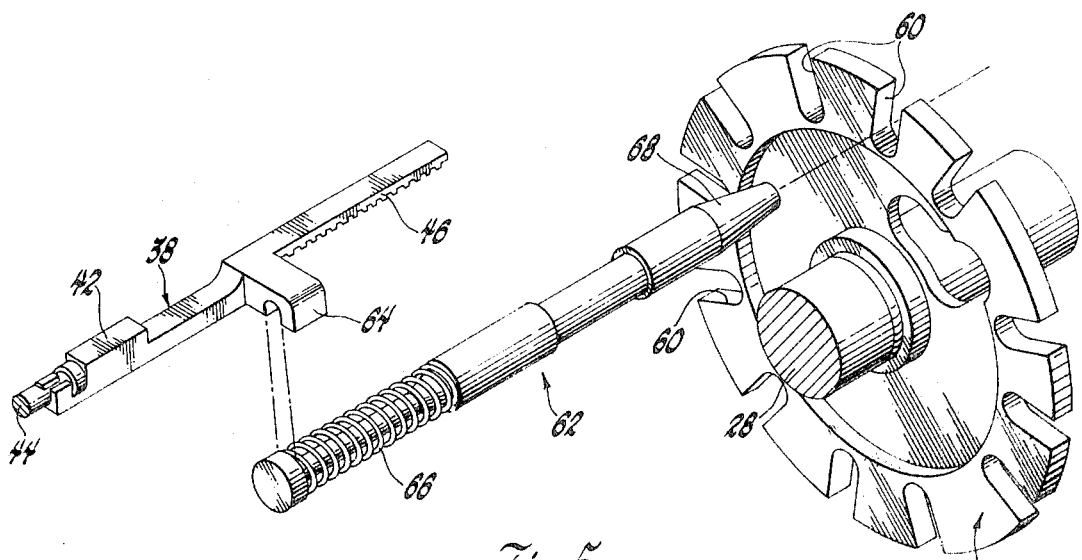
FIG. 5 is an exploded perspective view.

Coincidentally with these locking and unlocking functions respective to the shift bowl 20 and the ignition switch 32, the steering shaft 28 is placed in locked or unlocked condition. Mounted on the upper end of the steering shaft 28 by spline or like connection 56 is the hub of a steering shaft keeper plate 58, seen more clearly in FIGS. 3 and 5. The peripheral edge portions of the keeper plate are provided with a series of twelve or more keeper recesses or notches 60 for receiving the head of a steering shaft lock bolt. The lock bolt, designated 62, is closely slidably fitted within a suitable bore of the house 40 for slidable movement between a locked position as down in FIG. 2, and an unlocked position, not shown. Bolt 62 is moved through these positions by a connection with the shift bolt 38 including an ear 64 of the latter hooked over the headed end of the shank of the lock bolt and engaged at its other side by one end of a coil compression spring 66 bearing at its other end on a shoulder of the lock bolt 62. Accordingly, upon rotation of the actuator 48 from the locked position shown, moving the shift bolt 38 leftwardly, the leg or ear 64 thereof engaged with the headed end of lock bolt 62 carries the latter leftwardly also and removes the lock bolt from locked to unlocked position. Opposite rotation of the actuator 48 back to locked condition moves the bolt 38 rightwardly and the ear 64 carries the lock bolt 62 rightwardly through force exerted through the compression spring 66.

Lock 62 is provided with a locking head 68 having a tapered or frusto-right-conical form, the head in the locked position shown in FIG. 2 being engaged within a registered one of the notches 60 of the keeper plate 58 to bear all locking forces between these parts exclusively. The tapered end at 68 is selected at an angle $\theta$ to the axial centerline of bolt 62 selected with reference to best accomplishment of the objectives noted hereinabove, specifically the provision of a cam out force tending to move lock bolt 62 leftwardly from the locked position shown simply by the forced rotation of keeper plate 58 in either direction under high torque loading on steering shaft 28.

In the case of locking of the steering column with placement of bolt 62 in an aligned notch 60 of the keeper plate in conditions where large amounts of steering torque are exerted through the steering shaft 28 and the steering gearbox of the vehicle to rotate the dirigible wheels of the vehicle against the chassis stops or against a curb causing stressing of the vehicle suspension and steering linkage, such subsequent locking followed by release of manual effort on the steering wheel 18 often results in a residual torque in the train of steering elements from their seeking an unstressed state and this imposes substantial loadings between the keeper plate 58 and the projecting bolthead 68. With normal values of coefficient of friction between the keeper plate and the bolthead it can then be exceedingly difficult to manually rotate cylinder lock actuator 48 to an unlocking position removing bolthead 68 from the notch of the keeper plate. The taper provided on bolthead 68 answers to this difficulty in partaking of the residual torque in the steering shaft train to resolve therefrom a cam out force component directed axially of the bolt 62 tending it toward its unlocked position aiding the manual effort applied toward rotation of the actuator 48 in that direction.

While the design conditions relating to the circumstances just outlined will vary depending upon the materials used in the shaft bolt and keeper plate, it has been found that with tapering bolthead 68 with an angle $\theta$ on the order of 8°, head material of steel hardened to a value of 20—30 on the Rockwell C scale and having a cadmium plate, and further an application thereto of a suitable substantially dry lubricant, a sufficient cam out force on the bolt toward unlocked position is provided such that only about 30 inch-pounds of torque are required from the hand of the operator on the actuator 48 to remove the bolt toward its unlocked position in the presence of as much as 70 foot-pounds of torque in steering shaft 28 and keeper plate 58.

The taper provided on the lock bolt 62 serves the further function of preventing deliberate destruction of the steering column lock and associated parts within the steering column by theft attempts involving application of extremely high torque loading placed on the keeper plate 58, as by the use of pry bars or the like applied between the spokes of the steering wheel 18. In the design criterion outlined above, the 8° taper on bolthead 68 is effective to cause the bolt to cam completely out of its locked position by the application of approximately 150 foot pounds of torque to the steering wheel. This torque loading is of course by design sufficiently below the limits of torque sustainable in the steering wheel and steering shaft train and in bolt 62 and housing 40 without destruction. In any such attempt to deliberately destroy the lock, this camming out is of course effected against the resistance of spring 66, having a rate on the order of a few pounds per inch. Accordingly, in such attempts to forcibly rotate steering wheel 18, the result is a successive camming out of the lock bolt from its locked position and a successive reengagement of the bolt by the spring in the next adjacent notch 60. It is believed clear that the requirement for this 150 foot-pounds of torque to accomplish the ratcheting camming out of the lock bolt is much higher than any level at which a thief could conveniently steer the vehicle while attempting to drive it from its authorized location. As indicated, the specified design criterion may be varied to accomplish similar results by adjustments in friction coefficients between the keeper plate and the bolthead as by other plating or lubricating techniques, and by a change in the angle $\theta$ alone or in combination with different such properties in the keeper plate and bolt.

Having thus described the invention, what I claim is:

1. In an automotive vehicle steering column lock of the type including a keeper member fixed to the rotatable steering shaft component of the steering column and having a series of keeper portions, a steering shaft lock bolt movable in a path between an unlocked position out of engagement with said keeper member and a locked position engaging said keeper member to hold the steering shaft component against rotation, biasing means urging the lock bolt from the unlocked to the locked position thereof, and lockable means for controlling movement of said lock bolt between said positions thereof, the improvement which comprises providing said lock bolt with a locking head having a locking surface adapted for engagement in the locked position of the bolt with any of said plurality of keeper portions of said keeper member and formed at a predetermined angle with respect to the path of movement of said bolt, said angle of said surface being selected so that said surface is operative under forcible engagement therewith of said keeper member during forcible rotation of said steering shaft component with predetermined torque thereon to provide a cam out force on said bolt moving the latter from the locked to the unlocked position thereof against the action of said biasing means being successively engageable with and cammable from said series of keeper portions of said keeper member by such forcible rotation of said steering shaft component.

2. In an automotive vehicle steering column lock of the type including a keeper member fixed to the rotatable steering shaft component of the steering column, a steering shaft lock bolt movable in a path between an unlocked position out of engagement with said keeper member and a locked position engageable with said keeper member to hold the steering shaft component against rotation, and lockable and manually operable control means for moving said lock bolt between said positions thereof, the improvement which comprises providing said lock bolt with a locking head having a locking surface adapted for engagement in the locked position of said bolt with said keeper member and formed at a predetermined angle with respect to the path of movement of said bolt, said angle of said surface being selected so that said surface is operative under forcible binding engagement therewith of said keeper member during predetermined torque on said steering shaft component to provide a cam out force of specified value on said bolt tending to move the latter from the locked to the unlocked position thereof in aid of manual effort applied to said control means.

3. In an automotive vehicle steering column lock of the type including a keeper plate fixed to the rotatable steering shaft component of the steering column and having a series of keeper notches for receiving a steering shaft lock bolt reciprocable along an axis between an unlocked position out of engagement with said keeper member notches and a locked position engaging said keeper member to hold the steering shaft component against rotation, biasing means urging the lock bolt from the unlocked to the locked position thereof, and a cylinder lock actuator for controlling movement of said lock bolt between said positions thereof, the improvement which comprises providing said lock bolt with a locking head formed as a right circular cone on said axis and adapted for engagement in the locked position of said bolt with said keeper member in any of said notches thereof, the angle of said cone being selected so that said head is operative under forcible engagement therewith of said keeper member during forcible rotation of said steering shaft component with predetermined torque thereon to provide a cam out force on said bolt moving the latter from the locked to the unlocked position thereof against the action of said biasing means, said bolt by the action of said biasing means being successively engageable with and cammable from said series of keeper notches of said keeper member by such forcible rotation of said steering shaft component.